US009516688B2

(12) United States Patent
Konstantinou et al.

(10) Patent No.: US 9,516,688 B2
(45) Date of Patent: Dec. 6, 2016

(54) SYSTEM AND METHOD TO DELIVER DIFFERENT SERVICES OVER CELLULAR OR WIFI NETWORKS DEPENDING ON OPERATOR OR USER PREFERENCES

(71) Applicant: Cellco Partnership, Basking Ridge, NJ (US)

(72) Inventors: Kyriaki Konstantinou, New York, NY (US); Mauricio Pati Caldeira de Andrada, South Plainfield, NJ (US); Andrew Youtz, Princeton, NJ (US); Jiang Lan, Waltham, MA (US); Lin Song, Newton, MA (US); Jeff Evans, Lovettsville, VA (US)

(73) Assignee: Cellco Partnership, Basking Ridge, NJ (US)

( * ) Notice: Subject to any disclaimer, the term of this patent is extended or adjusted under 35 U.S.C. 154(b) by 259 days.

(21) Appl. No.: 14/097,722

(22) Filed: Dec. 5, 2013

(65) Prior Publication Data
US 2015/0163811 A1    Jun. 11, 2015

(51) Int. Cl.
| G01R 31/08 | (2006.01) |
| H04L 5/14 | (2006.01) |
| H04B 7/00 | (2006.01) |
| H04J 3/16 | (2006.01) |
| H04W 76/02 | (2009.01) |
| H04W 28/06 | (2009.01) |
| H04W 84/12 | (2009.01) |
| H04W 36/00 | (2009.01) |
| H04W 4/00 | (2009.01) |
| H04W 76/06 | (2009.01) |

(52) U.S. Cl.
CPC ........... *H04W 76/026* (2013.01); *H04W 4/008* (2013.01); *H04W 28/06* (2013.01); *H04W 36/0027* (2013.01); *H04W 76/064* (2013.01); *H04W 84/12* (2013.01)

(58) Field of Classification Search
CPC ........ H04W 4/00; H04W 36/00; H04W 28/06; H04W 84/12
See application file for complete search history.

(56) References Cited

U.S. PATENT DOCUMENTS

| 2009/0086704 A1* | 4/2009 | Ho ........................ H04L 1/1685 370/346 |
| 2010/0165857 A1* | 7/2010 | Meylan ............... H04L 12/2602 370/252 |
| 2011/0103318 A1* | 5/2011 | Ekici ..................... H04W 48/18 370/329 |

(Continued)

Primary Examiner — Faruk Hamza
Assistant Examiner — Abu-Sayeed Haque

(57) ABSTRACT

A method includes attaching to a Packet Data Network (PDN) supporting services over a long term evolution (LTE) network to establish a first network connection. The method includes connecting to a wireless local area network, e.g. a WiFi network, to establish a second network connection. The method further includes launching an application accessing at least one of the supported services and receiving a request from the application to switch between the first and second network connections, according to the supported service, e.g. a policy associated with the service. Switching from the first network connection to the second network connections includes connecting to the PDN via an evolved Packet Data Gateway (ePDG).

20 Claims, 7 Drawing Sheets

(56) References Cited

U.S. PATENT DOCUMENTS

| | | | | |
|---|---|---|---|---|
| 2011/0171953 A1* | 7/2011 | Faccin | ............... | H04W 48/08 |
| | | | | 455/426.1 |
| 2011/0286437 A1 | 11/2011 | Austin et al. | | |
| 2012/0008551 A1* | 1/2012 | Giaretta | ............ | H04W 36/0011 |
| | | | | 370/328 |
| 2012/0028638 A1* | 2/2012 | Mueck | ............... | H04W 36/18 |
| | | | | 455/426.1 |
| 2012/0071165 A1* | 3/2012 | Pampu | .................. | H04W 8/08 |
| | | | | 455/437 |
| 2012/0281563 A1* | 11/2012 | Comsa | ............... | H04W 24/10 |
| | | | | 370/252 |
| 2012/0315905 A1* | 12/2012 | Zhu | ..................... | H04W 36/36 |
| | | | | 455/436 |
| 2013/0039337 A1* | 2/2013 | Hwang | ............ | H04W 36/0066 |
| | | | | 370/331 |
| 2013/0242965 A1* | 9/2013 | Horn | ................... | H04W 24/10 |
| | | | | 370/338 |
| 2014/0254576 A1* | 9/2014 | Varma | ................ | H04W 48/16 |
| | | | | 370/338 |
| 2015/0141009 A1* | 5/2015 | Tamura | ............... | H04W 40/38 |
| | | | | 455/435.1 |

\* cited by examiner

SYSTEM AND METHOD TO DELIVER DIFFERENT SERVICES OVER CELLULAR OR WIFI NETWORKS DEPENDING ON OPERATOR OR USER PREFERENCES

BACKGROUND

The prevalence of WiFi networks public spaces and homes over the last several years has made WiFi connectivity a standard feature in cellular devices such as smartphones and tablets. Users of cellular devices have turned to WiFi networks as a means of wireless connectivity and to preserve data usage for their data plans with their cellular providers. Interoperability between cellular Long Term Evolution (LTE) networks and WiFi networks has been the center of significant work in the 3rd Generation Partnership Project (3GPP), the standards body that governs LTE network specifications. It is often desirable to provide a user the option to use a WiFi network as a data connection as an alternative to the cellular connection.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
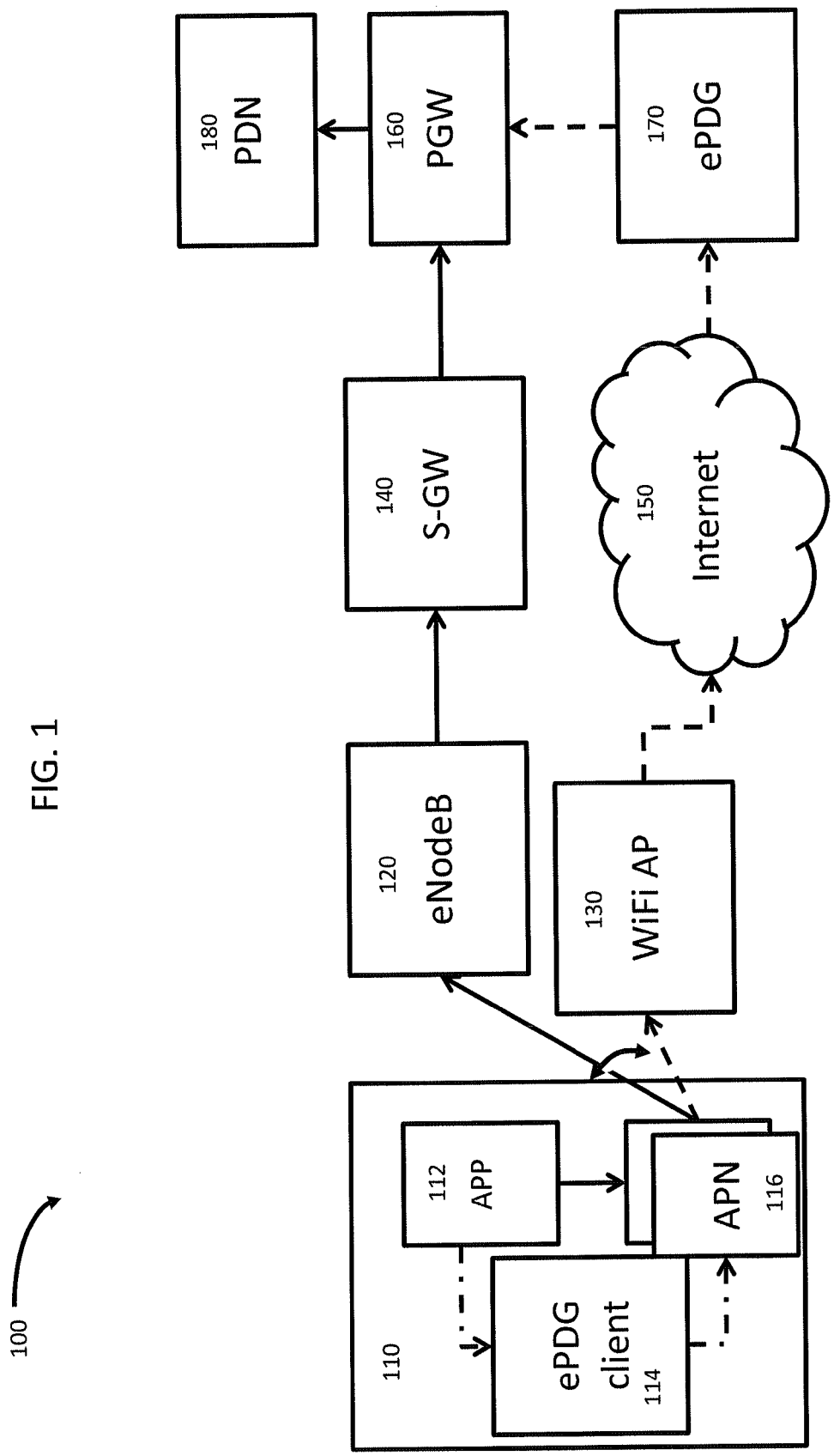
FIG. 1 is a block diagram illustrating an example of a system for dynamic switching of a connection to PDN from LTE to WiFi based on a request from a user equipment (UE).

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

3GPP has published methodologies that support seamless transition between a Long term Evolution (LTE) cellular network and WiFi networks. The approach adopted by most networks involves a method that allows the cellular devices to independently connect to each packet data network (PDN) via an LTE network or a WiFi network depending on user preferences. It also provides a means of transitioning between the LTE and WiFi network while maintaining IP continuity for the particular PDN. The method is called Multi Access Packet Data Network Connectivity (MAPCON) and described in 3GPP documents. However, one limitation of this approach is that all traffic for a specific PDN is routed either on LTE or WiFi. Also, the mapping of a particular Access Point Name (APN) in an LTE or WiFi network is typically static and may not be changed dynamically.

This approach constrains the various services that are supported on a PDN to either LTE or WiFi with no flexibility to route some services on LTE and some on WiFi. An example of this limitation involves services supported on the IP Multimedia Subsystem (IMS) such as Voice over IP (VoIP), which is typically a low bandwidth application, and video calls, which are typically high bandwidth applications. Once the device establishes connectivity to an IMS on either LTE or WiFi, both the VoIP and the video call are routed over the same network.

However, operator requirements and user expectations are not the same for these two services. VoIP calls are expected to preserve the same quality as Circuit Switched (CS) voice calls in today's cellular networks. This may be ensured in LTE networks through a number of Quality of Service (QoS) requirements that operators implement on their networks. Publicly available WiFi networks, on the other hand, do not always provide QoS or even the data rates that preserve the quality of voice that users are used to in today's cellular networks. Video Calls, on the other hand, are a relatively new service offered over cellular networks. It is a data hungry application by its nature.

Therefore, it may be beneficial for users to have the flexibility to establish video calls over WiFi networks in order to reduce the amount of data consumed through their cellular data plans (and thus mitigate costs), even at the expense of the quality of the video call. For example, it would be beneficial to route a high bandwidth application over a wireless local area network (WLAN) which may include one or more WiFi networks, whereas, a low bandwidth application may be routed over LTE. The above flexibility is not supported by MAPCON.

An alternative approach that addresses the above case, IP flow mobility (IFOM), is being developed by 3GPP. This alternative approach, however, still has technical gaps that need to be defined and results in significant impact on cellular networks and devices.

In the examples presented here, a way of overcoming some of the limitations of MAPCON are provided in order to allow applications with different requirements to be treated differently, for example, when a device connects to a WiFi network. This may allow applications that offer different services to trigger the use of LTE networks or WiFi networks depending on user preferences and operator pre-defined requirements stored on the device.

Reference now is made in detail to the examples illustrated in the accompanying drawings and discussed below. FIG. 1 is a block diagram illustrating one example of a system 100 for dynamic switching of a connection of a user equipment (UE) device 110 (also referred to herein as UE or user device) to PDN 180 from Long Term Evolution (LTE) network through an evolved Node B (eNB) 120 of the LTE network to a WiFi Access Point (AP) 130, based on a request from a user equipment (UE) 110. In the example, UE communications that utilize the WiFi AP 130 are routed through the public Internet 150, and an evolved packet data gateway (ePDG) 170 to a packet gateway (PGW) 160. UE communications that utilize the eNB 120 of the LTE network are routed by a Serving Gateway (SGW) 160 to PGW 160. The PGW 160 in turn provides communications access to the PDN 180, for various services that rely on packet data transport. Although the packet communications under consideration here may support many services for the UE that go to/from the PDN 180, for discussion purposes, many of the examples below relate to voice and/or video calls. In such a case, other user devices (not shown) that may be involved in calls with the UE 110 communicate with that UE via the PDN 180 and may access the PDN 180 via technologies like those used by the UE 110 although the other devices may utilize different access technologies.

In the present examples, the UE 110 includes or communicates through other equipment that has wireless communication capabilities, both for LTE and WiFi. UE 110 may include a wireless telephone, a cellular telephone, a smart phone, a personal digital assistant (PDA) (e.g., that can include a radiotelephone, a pager, Internet/intranet access, etc.), a tablet computer, a laptop computer (e.g., with a wireless air card), or other types of computation or communication devices. In one example, UE 110 may include one or more wireless interface devices capable of wirelessly communicating over an LTE network via an eNB 120, and/or PDN 180. In yet another example, the UE 110 may include one or more wireless interface devices capable of wirelessly communicating to connect to the PDN 180 via WiFi Access point (AP) 130 through ePDG 170.

eNB or base station 120 may include one or more devices that receive, process, and/or transmit traffic, such as audio, video, text, and/or other data, destined for and/or received from user device 110. In an example implementation, base station 120 may be associated with an LTE network that receives traffic from and/or sends traffic to PDN 180 via SGW 140 and PGW 160. Base station 120 may send traffic to and/or receive traffic from user device 110 via an air interface. In another example, one or more other base stations 120 may be associated with a radio access network (RAN) that is not associated with the LTE network.

SGW 140 may include one or more computation or communication devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic.

In one example implementation, SGW 140 may aggregate traffic received from one or more base stations 120 associated with the LTE network, and may send the aggregated traffic to network 180 (e.g., via PGW 160) and/or other network devices associated with the PDN 180. SOW 140 may also receive traffic from the other network devices and/or may send the received traffic to user device 110 via base station 120. SGW 140 may perform operations associated with handing off user device 110 from and/or to the LTE network. For example, SGW 140 may route and forward user data packets, may act as a mobility anchor during inter-eNB handovers, and may act as an anchor for mobility between LTE and other 3GPP technologies. For idle state UEs, SGW 140 may terminate a downlink (DL) data path and may trigger paging when DL data arrives for UE 110. SGW 140 may manage and store contexts associated with UE 110 (e.g., parameters of an IP bearer service, network internal routing information, etc.)

PGW 160 may include one or more data transfer devices (or network devices), such as a gateway, a router, a switch, a firewall, a network interface card (NIC), a hub, a bridge, a proxy server, an optical add drop multiplexer (OADM), or some other type of device that processes and/or transfers data. In one exemplary implementation, PGW 160 may provide connectivity of UE 110 to external packet data networks (e.g., to PDN 180) by being a traffic exit/entry point for UE 110. UE 110 may simultaneously connect to more than one PGW for accessing multiple PDNs. PGW 160 may perform policy enforcement, packet filtering for each user, charging support, lawful intercept, and packet screening. PGW 160 may also act as an anchor for mobility between 3GPP and non-3GPP technologies.

In one example implementation, PGW 160 may include a device that aggregates traffic received from one or more SGWs 140, etc. and may send the aggregated traffic to network 180. In another example implementation, PGW 160 may receive traffic from network 180 and may send the traffic toward user device 110 via SGW 140.

PDN 180 may include a network that provides data services (e.g., via packets), such as the Internet, an intranet, an asynchronous transfer mode (ATM) network, etc. PDN 180 may also include one or more networks, such as a local area network (LAN), a wide area network (WAN), a metropolitan area network (MAN), a telephone network, the Internet, etc., capable of communicating with UE 110. In one example PDN 180 may include a network that breaks up a message (e.g., information) into packets for transmission. Unlike a circuit switching network, which establishes a dedicated point-to-point connection, each packet in PDN 180 may include a destination address. Thus, all packets in a single message may not travel the same path. As traffic conditions change in PDN 180, the packets may be dynamically routed via different paths in PDN 180, and the packets may even arrive out of order. A destination device in PDN 180 may reassemble the packets into their proper sequence.

The alternative access network based on a wireless local area network technology may include a WiFi network Access Points 130, or multiple different WiFi networks, to which mobile devices 110 may connect. More generally, WiFi network 130 may include any locally available wireless network. For example, a user may install a home WiFi router that may be used to connect the user device 110 to a wired network (e.g., a coaxial or fiber optic network) that is connected to the user's home. As another example, a business may install a number of WiFi access points that are used to wirelessly connect devices in a local office to a wired network. In yet another example, the WiFi network may be available at a public area, such as at a train station, at a restaurant, etc. As such, the WiFi network may be accessible to general public.

The ePDG 170 may function to secure the data transmission with UE 110 that connects over an untrusted non-3GPP access, for example. For this purpose, the ePDG acts as a termination node of IPsec tunnels (not shown) established with the UE. For example, when the UE 110 moves into or attaches initially in an untrusted non-3GPP access it first discovers an ePDG, establishes an IPsec Key Exchange IKEv2/IPsec tunnel with the ePDG and then connects to the PGW over the ePDG IPsec tunnel (not shown) between PGW and ePDG. On the other hand, when the UE moves into or attaches initially in a trusted non-3GPP access, for example via a virtual private network, it may connect directly to the PGW 160 via a Mobile IP (MIP) tunnel (not shown). For example, when a UE 110 performs a handover to an untrusted non-3GPP access network, the UE may first discover an ePDG and then establish a secure tunnel to the ePDG, before the UE can send and receive user data.

Internet 150 is a global public network that may be used to connect to the PDN 180 through the WiFi network. In one example, Access Point Name (APN) 116 may be a name of an access point between a mobile network (e.g., 3G, LTE) or a WiFi network and another data network (e.g., PDN).

App 112 is an application that may be launched by a user. In one example, App 112 may be an application that initiates a VoIP call and/or a video call upon execution thereof in the UE 110. App 112 may utilize the APN 116 when connecting to the PDN via eNB 120, for example, over the LTE network. For example, App 112 may initiate a service which may be routed over the LTE network. In such a scenario, APN 116, having a specific access point name, may point to eNB 120, for example, to connect to the PDN 180 via S-GW 140 and PGW 160. In another example, App 112 may initiate another service that may be routed over WiFi network. APP 112 may then utilize APN 116 via ePDG client 114. In this case, APN 116, may be a different access point name, and point to the WiFi network 130, for example. Thus, the other service may be routed over to the PDN 180 via ePDG 170 and PGW 160.

In an example, it is assumed that the UE 110 follows 3GPP requirements regarding connectivity to the network element ePDG 170 and MAPCON policy. The basic operation of the system is shown in FIG. 1 that describes how connection to a APN 116, PDN 180, can be switched between LTE and WiFi based on a trigger from the application APP 112 that would request to be run over WiFi or LTE, according to the operator's policy stored in the UE, for example. Alternatively, switching may occur based on a user preference. For example, as detailed further in the description of FIGS. 5 and 6, the user may be provided with the option of switching between the LTE and WiFi based on different QoS metrics of the WiFi. For example, a notification related to the quality of service for a specific service (e.g., video call) may be displayed on the UI of the UE 110 (not shown). The notification may include messages such as: excellent, good, fair, poor. Upon being notified by the displayed notification, the user may choose the connection of his/her choice (see FIG. 7). In another example, the user preference may be set during a configuration session on a configuration screen (not shown) of the UE 110. The configuration screen may list all the applications available on the UE 110. The user may then set his/her preference of a default network connection (either WiFi or LTE) for each of the listed applications. The user may also set a preference of 'switch' on the configuration screen that may allow the user to switch to another network connection from the preferred default network connection. Upon selecting the switch option, the UE may utilize the QoS metrics, as detailed below, to perform the switching.

In one example, the UE 110 may connect to the PDN 180 by establishing a network connection to the PDN 180 via eNB 120 of the LTE network. Specifically, the UE 110 may attach to the PDN 180 over the LTE network, for example, via eNB 120. For example, the Mobility Management Entity (MME) of the LTE network (not shown) may be involved in the attachment process during which the UE 110 may register itself to the LTE network by interacting with the MME. During this step, the UE 110 may also be authenticated by the network. For example, at this step, the MME may communicate with the Home Subscriber Server (HSS) within the network (not shown), which is a central database in the network containing user-related and subscription-related information. Particularly, the user profile in the HSS may be used to authenticate the user and to authorize services such as mobility management, call and session establishment support, etc.

In another example, UE 110 may establish another network connection to the PDN 180 via WiFi AP 130. For example, the UE 110 may establish a connection with a WiFi access point at a coffee shop. The UE may initially determine where a WiFi network is available. During this step, Access Network Discovery and Selection Function (ANDSF) (not shown), an entity within the network, may provide information to the UE about connectivity to non-3GPP access networks, such as WiFi networks. The ANDSF may also assist the UE to discover the access points of networks in its vicinity. Based on the discovered networks, the UE 110 may then register itself with one of the WiFi networks. In one example, during the registration process, the UE 110 may request the user to provide a password to register with the WiFi network.

In one example, UE 110, making a data connection, may be configured with APN 116. The APN may identify the PDN 180 that a mobile data user wants to communicate with for one or more services, such as for voice and/or video calls in several of the examples. In addition to identifying a PDN, an APN may also be used to define the type of service, (e.g. connection to wireless application protocol (WAP) server, multimedia messaging service (MMS)), that is provided by the PDN. APN is used in 3GPP data access networks, e.g. evolved packet core (EPC).

In another example, the APP 112 on the UE 110 may notify the ePDG client 114, also on the UE 110, when a mobile originated (MO) or a mobile terminated (MT) connection is established. Once the connection is established, the ePDG client 114, triggers the switch of the connection to the PDN 180 over WiFi 130 through ePDG 170, according to a trigger function of APP 112.

For example, APP 112 may trigger the handover of the LTE connection to the PDN 180 over to the WiFi network. Alternatively, APP 112 may trigger the switch back from the WiFi network to the LTE network for the connection to the PDN 180.

The trigger operation from APP 112 may be based on an operator's policy related to the quality of service offered by one or more of the available wireless access technologies. Parameters or metrics used to define and measure the quality of data transmissions over IP are commonly referred to as quality-of-service (QoS) parameters, examples of which include parameters such as packet loss, delay, and jitter. In several examples discussed herein, the policy in the UE establishes one or more QoS thresholds in relation to such metrics for the associated service, which the UE may then utilize in decisions to select and/or switch between LTE and WLAN access technologies. QoS monitoring includes, for example, monitoring parameters (e.g., delay, jitter, packet loss, signal strength, signal-to-noise ratio) for VoIP applications, video calls or other services provided by the APP 112 for data transmissions over the WiFi network 130. A result of the monitoring result is compared to one or more thresholds of the policy for the service, and the results of the comparison can be used in the routing decisions of the UE for the particular service. Similar monitoring and threshold comparisons may be applied to LTE.

The thresholding may utilize individual thresholds for one or more metrics of QoS, e.g., a threshold for data rate and another threshold for error rate, etc. One metric may be sufficient to control a decision, e.g., if the data rate is too low on WiFi to support a video call. Alternatively, some combination of threshold comparison results may be used, e.g., a data rate above a threshold in combination with an error rate below another threshold is sufficient for a voice call. Another approach combines the various QoS metrics into one combined metric for comparison to one overall QoS metric threshold. The number of metrics implemented may be controlled or determined by the UE 110. For example, based on the number of metrics available, the UE may check whether half of the available metrics meet the overall metric threshold. If half of the available metrics meet the threshold, the UE may then ignore the rest of the available metrics. The UE may also check whether each of the metrics meets the overall threshold, upon determining that half of the metrics failed to meet the overall metric threshold. In yet another example, the metrics may be weighted (e.g., different metrics may be given different priorities). The UE 110 may then evaluate the metrics with higher priorities over metrics with lower priorities (e.g. the UE may decide that two metrics with higher priorities may be sufficient for meeting the overall threshold even though three different metrics with lower priorities failed to meet the threshold criteria).

The QoS parameters monitored therefore are useful for determining whether data transmissions are being delivered at a desired level of quality. For example, when the data transmissions involve voice services transmissions, it is typically desirable for the voice services transmissions to exhibit a PSTN-grade (also known as toll-quality) voice quality, which is often defined as a mean opinion score (MOS) of at least approximately 4.0. For business-grade voice services, a MOS of approximately 3.5 to 4.0 is expected. For example, if the available WiFi route exhibits an MOS higher than 3.5 (a threshold set in the policy for voice service), then the policy causes the UE to make a voice over the WiFi route (or switch to WiFi if previously engaged in a voice call over LTE).

In a similar fashion, QoS may also be monitored for the quality of a video call generated over an IP network. Thus, in one example, responsive to the monitored quality of the video call, the UE 110 may switch the service of the video call from the LTE cellular network to WiFi. In one example, the monitoring for the quality of a video call may be performed and a corresponding QoS metric may be stored in UE 110. The monitoring may be performed over a predetermined amount of time.

UE 110 may determine to switch between networks upon comparing a QoS metric for the video call over the LTE network with a QoS metric of a WiFi video call as defined in a policy for the video call service. In one example, the QoS metric of the video call over the LTE network may be compared to the QoS metric of the WiFi video call, when both of the QoS metrics are the same. However, when the QoS metrics are not the same, the UE may convert one of the QoS metrics (i.e., either the WiFi QoS or the LTE QoS for the video call), so that the metrics can be compared. A QoS metric of a video call may be the packet loss data of the video call. UE 110 may compare the packet loss data of the LTE video call with that of WiFi video call. The UE may perform the comparison based on a historic QoS metric value of the video call that the UE is not currently on (i.e., either the WiFi QoS or the LTE historic QoS metric value of the video call). The UE may store the metric values for a predetermined number of video calls and, based on an average metric value of the predetermined number of video calls, the UE may set respective historic QoS metric values for the video calls on the LTE and WiFi networks. The UE may then determine to switch based on the comparison between the historic packet data value of the video call (e.g., the video call that the UE is not currently on) with an instantaneous packet data value of the other video call (e.g., the video call that UE is currently on). Alternatively, the UE may use a default QoS metric value for the video call that it is not currently on.

In one example, the packet loss may be higher for the LTE video call compared to the packet loss of the WiFi video call. As such, the UE may then determine to switch from the LTE network to the WiFi network 130. This may provide the user of the UE 110 with a superior video call. For example, the UE 110 may display a temporary notification on the UE display (e.g., at the corner of the user interface (UI)) to notify the user that the network usage has switched. In another example, the UE may provide the user an option to switch between the LTE and WiFi network via the UI of the UE (e.g., see FIG. 7). The user may then override the determination made by the UE by switching to the network of his/her preference. For example, the UE may switch a video call on the LTE network, however, to reduce cost (e.g., carrier related data usage cost), the user of the UE may override and switch back to the WiFi network. The user of the UE, however, may still continue to use the LTE network for a less data intensive application (e.g., VoIP application).

Based on the decision to trigger a switch in view of monitored QoS in relation to the QoS policy for the service, the connection to the PDN 180 is handed over to ePDG 170 from the LTE network/eNB 120. Thus, a service on the APP 112 may continue on WiFi 130. When the service ends, the APP 112 may notify the ePDG client 114, which may then initiate a handover back to the LTE cellular network 120.

Figure 2:
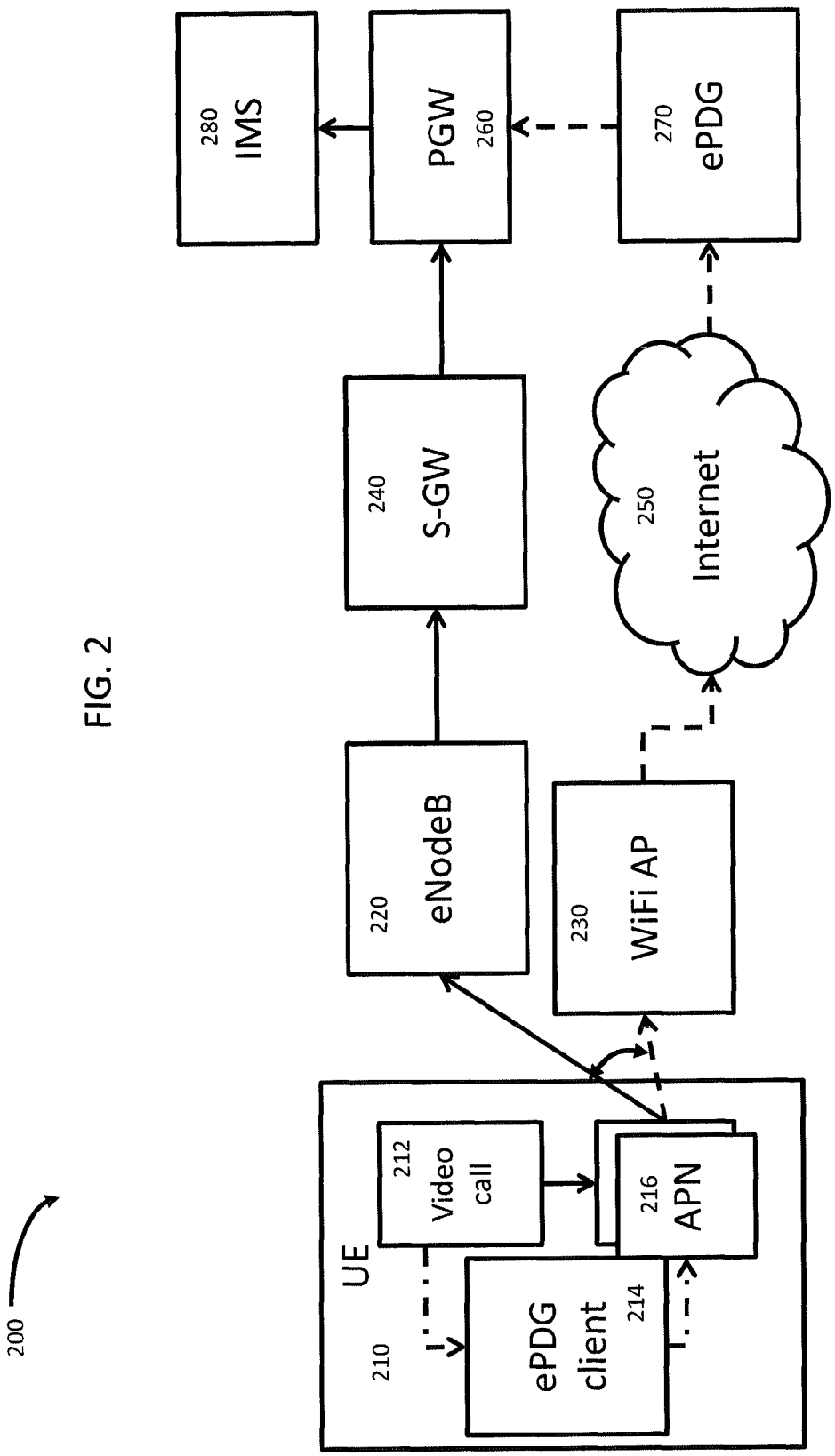
FIG. 2 is a block diagram depicting an example when a video call is switched from LTE to WiFi.

FIG. 2 is an example system in which voice services supported by IP Multimedia Core Network Subsystem (IMS) 280 remain on the cellular network LTE network or eNB 220, while another service, such as video calling supported by IMS 280, may use the WiFi network 230 when such a network is available. In one example, dynamic switching of the connection to the IMS may take place when a video call is initiated or received by UE 210.

Components of the system 200 are similar to the components of system 100. For example, eNB 220, SGW 240, PGW 260, WiFi AP 230, UE 210 and ePDG 270, internet 250 have the same or similar functionalities as eNB 120, SGW 140, PGW 160, UE 110 and ePDG 170, internet 150. IMS 280, however, may provide different functionalities compared to the PDN 180 of system 100. IP Multimedia Subsystem or IP Multimedia Core Network Subsystem (IMS) 280 may include an architectural framework or network (e.g., a telecommunications network) for delivering IP multimedia services. In one example, the IMS 280 may support VoIP and video call services.

In one example, the video call client 212 on the UE may notify the ePDG client 214 on the user device 210 when a mobile originated (MO) or a mobile terminated (MT) video call is established. Once the call is established, the ePDG client 214 may switch the connection to the IMS 280 over WiFi network 230 through ePDG 270 from the LTE network. Once the connection to the IMS 280 is handed over to ePDG 270, the video call may then continue on WiFi 230. When the video call ends, the video call client 212 notifies the ePDG client 214 that it may initiate a handover back to the LTE cellular network 220.

In one example, the device 110 may have a list of default PDN connections when both WiFi and LTE are available, similar to a static MAPCON policy. This policy can be overridden by specific services to move the connection to a specific PDN (e.g., VoIP or a video call) to either LTE cellular or ePDG depending on the operator specified requirements for these services. For example, the MAPCON policy may state that whenever the device 210 connects to a WiFi network, for example to WiFi AP 230, it will switch over the connection from LTE to WiFi to access the internet, for example, IMS 280. In other words, once a switch over to WiFi is made, the policy states that all the services will be routed over WiFi. In another example, static MAPCON policy may state that even if WiFi is available, all the services may be routed over the LTE network. However, according to the present example, the MAPCON policy may state that IMS 280 may not switch through WiFi 230 except in the case where specific services are available on IMS 280. Therefore, the MAPCON policy may be overridden responsive to the service supported in the IMS 280. In another example, the policy may also be overridden responsive to the QoS of the service, as described earlier. In one example, when connected to an IMS 280 that supports both VoIP and video call, according to the policy, all the services may be routed over LTE network 220 even if there is WiFi service available. However, once a video call service is initiated or received, the policy may be overridden, and the video call service may then be switched over to the WiFi network while maintaining a VoIP call over the LTE network by the UE. Alternatively, the user of the UE may be notified of the QoS for the video call that is already running on the LTE. Based on the notification, the user may override the policy by routing the video call through the WiFi network while keeping other services on the LTE network.

For example, the UE 110 may determine to override the policy related to a QoS metric of a LTE video call by overriding a policy stored in the UE 110. The UE 110 may first compare the QoS metric of the LTE video call to another QoS metric of a WiFi video call. Upon comparison, the QoS metric of the WiFi video call may be better than the QoS metric of the LTE video call. The UE may then override the stored policy of routing the video call over the LTE network. As such, according to the overridden policy, the video call may be switched from the LTE network to the WiFi network.

Alternatively, the policy may be overridden again to route all the services over LTE network, regardless of the service. This may occur due to a poor WiFi connection, for example. Yet, in another example, the VoIP may be switched over to the WiFi network, due to a poor QoS metric of the VoIP service over the LTE network.

The rules for overriding the default policy may be stored on the UE 110 and may be defined per application. For example, video call APP 212, requesting a switch between LTE and WiFi may have a means of notifying the ePDG client 214 on the device 210 when it should perform the switch. Alternatively, the UE may set the rules for overriding the policy upon receiving feedback related to the QoS experienced by the application. Yet in another example, a user may set the rules for overriding the policy and store these rules in the UE.

Figure 3:
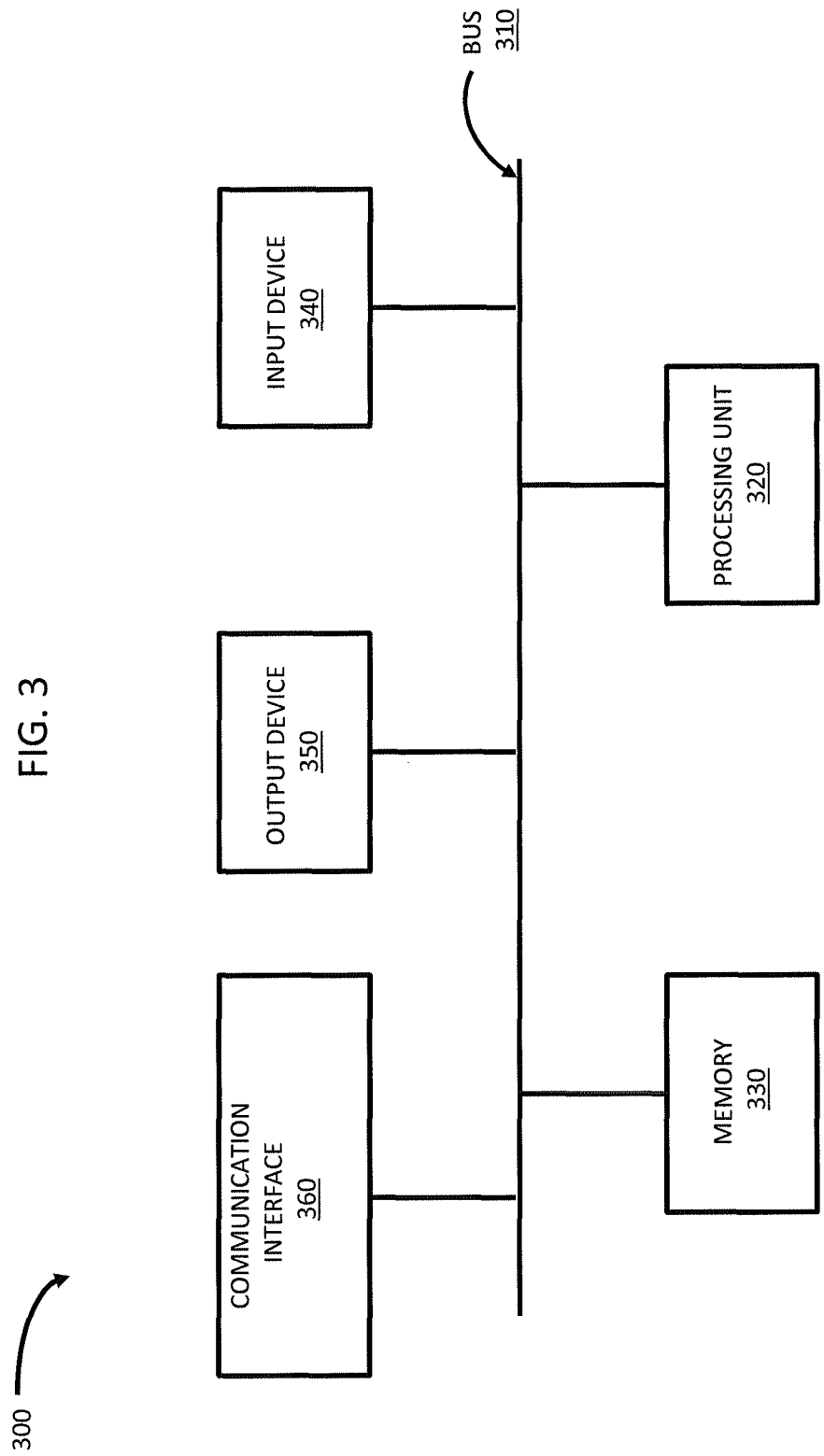
FIG. 3 is a diagram of example components of a device that corresponds to one of the devices of the network depicted in FIGS. 1 and 2.

FIG. 3 is a diagram of exemplary components of a device 300. Device 300 may correspond to user device 110/210, SGW 140/240, PGW 160/260. Alternatively, or additionally, each of user device 110/210, SGW 140/240, PGW 160/260 may include one or more devices 300.

Device 300 may include a bus 310, a processing unit 320, a memory 330, an input device 340, an output device 350, and a communication interface 360. Although FIGS. 1 and 2 show example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components.

Bus 310 may include a path that permits communication among the components of device 300. Processing unit 320 may include a processor, microprocessor, or processing logic that may interpret and execute instructions. Memory 330 may include any type of dynamic storage device that may store information and instructions, for execution by processing unit 320, and/or any type of non-volatile storage device that may store information for use by processing unit 320.

Input device 340 may include a mechanism that permits a user to input information to device 300, such as a keyboard, a keypad, a button, a switch, etc. Output device 350 may include a mechanism that outputs information to the user, such as a display, a speaker, one or more light emitting diodes ("LEDs"), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 180/280. In one alternative implementation, communication interface 360 may be a logical component that includes input and output ports, input and output systems, and/or other input and output components that facilitate the transmission of data to other devices.

As described herein, device 300 may perform certain operations relating to dynamic switching between LTE and WiFi networks. Device 300 may perform these operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Figure 4:
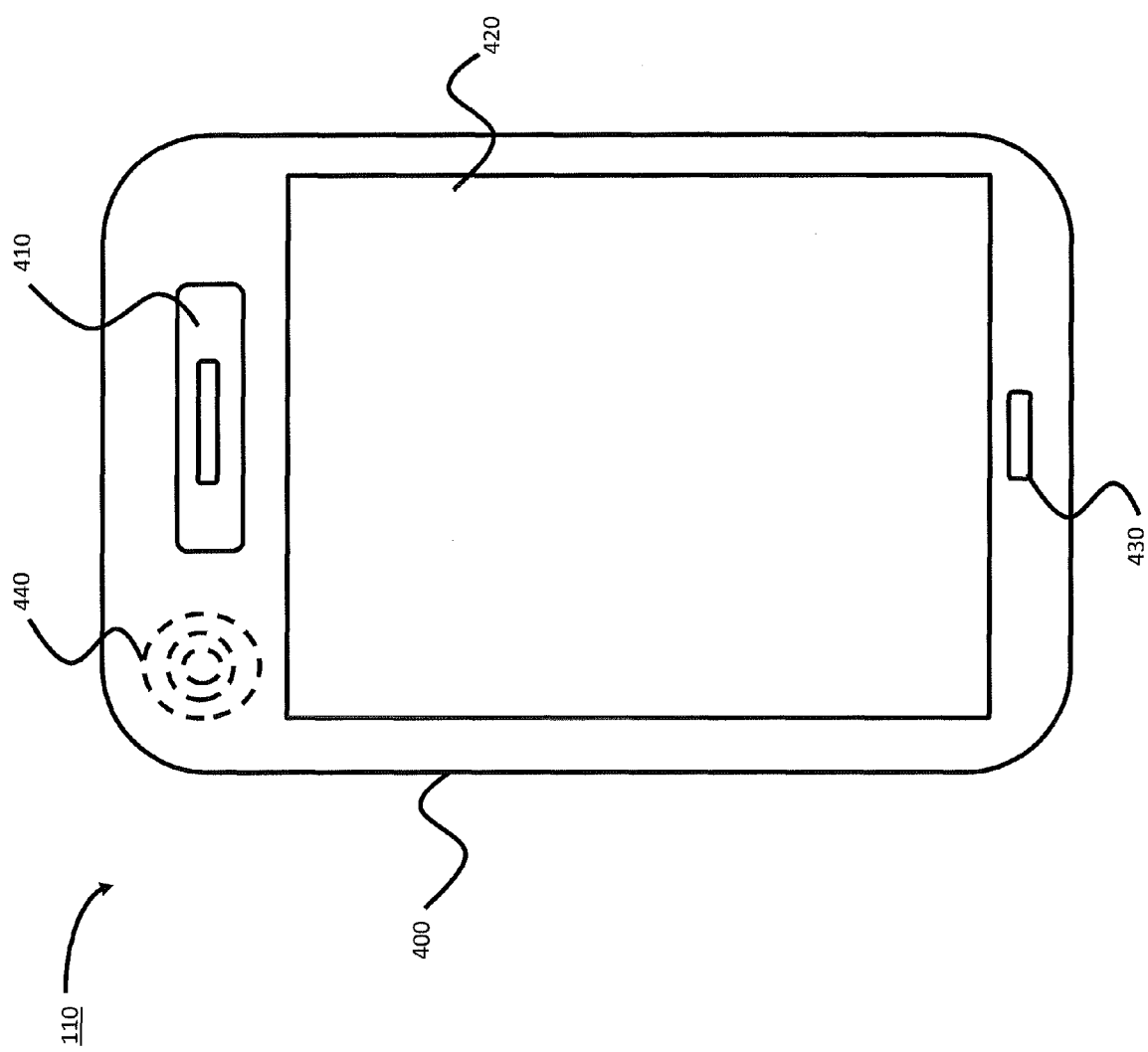
FIG. 4 is a diagram of an example user device depicted in FIGS. 1 and 2.

FIG. 4 is a diagram of an example user device 110 or 210. As shown in FIG. 4, user device 110 may include housing 400, speaker 410, display 420, microphone 430, and/or camera 440. Housing 400 may include a chassis via which some or all of the components of user device 110 are mechanically secured and/or covered. Speaker 410 may include a component to receive input electrical signals from user device 110 and transmit audio output signals, which communicate audible information to a user of user device 110.

Display 420 may include a component to receive input electrical signals and present a visual output in the form of text, images, videos and/or combinations of text, images, and/or videos which communicate visual information to the user of user device 110. In one implementation, display 420 may display text input into user device 110, text, images, and/or video received from another device, and/or information regarding incoming or outgoing calls or text messages, emails, media, games, phone books, address books, the current time, etc.

Display 420 may be a touch screen that presents one or more images that correspond to control buttons. The one or more images may accept, as input, mechanical pressure from the user (e.g., when the user presses or touches an image corresponding to a control button or combinations of control buttons) and display 420 may send electrical signals to processing unit 320 that may cause user device 110 to perform one or more operations. For example, the control buttons may be used to cause user device 110 to transmit information. Display 420 may present one or more other images associated with a keypad that, in one example, corresponds to a standard telephone keypad or another arrangement of keys.

Microphone 430 may include a component to receive audible information from the user and send, as output, an electrical signal that may be stored by user device 110, transmitted to another user device, or cause user device 110 to perform one or more operations. Camera 440 may be provided on a front or back side of user device 110, and may include a component to receive, as input, analog optical signals and send, as output, a digital image or video that can be, for example, viewed on display 420, stored in the memory of user device 110, discarded and/or transmitted to another user device 110.

Although FIG. 4 depicts examples of components of user device 110, in other implementations, user device 110 may include fewer components, additional components, different components, or differently arranged components than illustrated in FIG. 4. For example, user device 110 may include a keyboard, a keypad, and/or other input components. In still other implementations, one or more components of user device 110 may perform one or more tasks described as being performed by one or more other components of user device 110.

Figure 5:
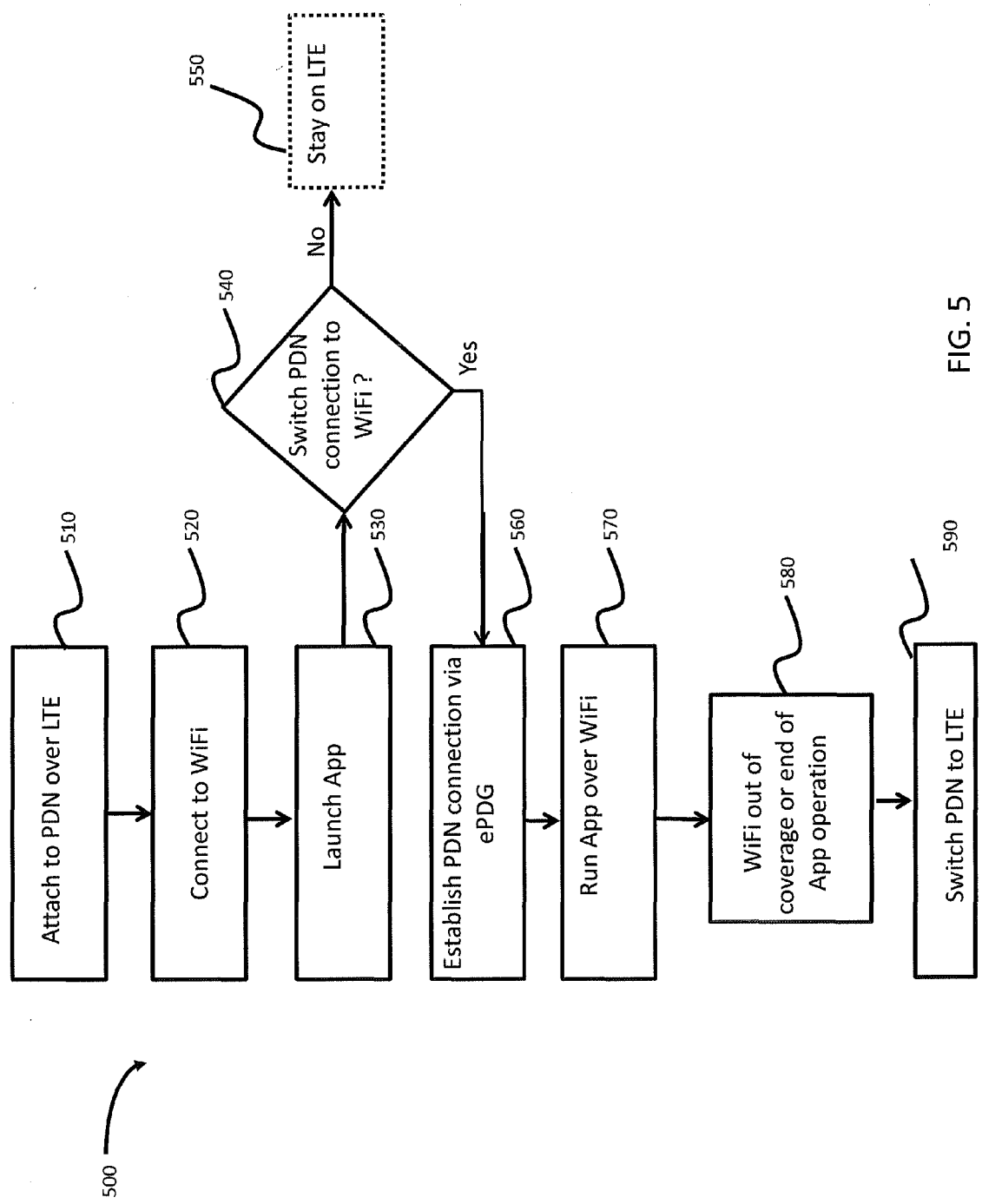
FIG. 5 is a diagram of an example process for a user device dynamically switching a connection to PDN from LTE to WiFi.

FIG. 5 is a flow diagram of an example process for a UE 110 dynamically switching a PDN connection from a LTE cellular network to WiFi. In detail, FIG. 5 shows the high level flow chart of the above methodology for switching between LTE cellular network and WiFi/ePDG in order to access or offer services supported on a particular PDN.

At step 510, the UE 110 attaches to the PDN 180 according to the APN 116 over the LTE network, for example, via an eNB 120. During the attachment the UE 110 may register itself to the LTE network to obtain subscribed services from the PDN 180. During this step, the UE 110 may also be authenticated by the LTE network and the network may be updated as to where the UE 110 is located. In one example, during this procedure, an IP address for the mobile device may be obtained, so that direct communication with another internet device may be possible.

At step 520, the UE 110 connects to a WiFi AP 130. The WiFi AP could be a public access point, for example, a public WiFi access at a coffee shop, or a WiFi access point on a public train. Alternatively, the WiFi AP may be a private access point, for example, in a home or in an enterprise location such as an office. The UE 110 may initially determine whether a WiFi AP is available. If available, the UE 100 may connect to the WiFi AP 130 and UE 110 may register the connectivity to the WiFi according to the APN 116. At step 530, the user may launch APP 112 for a particular service supported by the PDN. The APP 112 may then request the user to switch between the LTE and WiFi networks at step 540.

The APP 112 may provide the request in the form of a notification on the UI of the UE. The notification may include a reason for the request to switch (e.g., the UE may display a notification stating "poor quality of connection" on the UI). In one example, if the user does not respond to the displayed notification, the UE may automatically perform the switch after a predetermined time. The determination to switch may be responsive to a policy related to the particular service provided in the PDN 180. For example, if the APP 112 is for a video call type of service, then the policy would be the policy associated with the video call service. The policy may be further related to a QoS metric.

In the video call example, the policy defines one or more thresholds in relation to QoS. In one example, the operator servicing the UE 110 may provide the QoS metric. Alternatively, UE 110 may, itself, monitor over time quality information related to the specific service supported by the PDN. During monitoring, the UE may gather and store the quality information related to a specific service. Comparison of QoS metrics may be performed to determine when to switch between the networks. In one example, comparison may be made instantaneously using the QoS metric provided by the operator. Alternatively, comparison may be made based on average historic QoS values, as discussed earlier.

If the UE 110 decides to switch to the WiFi AP from the LTE network, at step 560, the ePDG client 114 may then be notified by the APP 112 to establish the connection to PDN 180 via ePDG 170. The switching may also occur dynamically without any user interference, for example. For example, the switch to WiFi may occur when a QoS metric is above a QoS threshold, and the switch back may occur when the QoS metric falls below same threshold. In one example, a determination to switch may also be based on a metric staying below or above a threshold for a predetermined time. Yet in another example, a determination to switch back may be based on a different metric or another predetermined time. In one example, the QoS metric may be related to data packets and a threshold may be set according to a predetermined number of data packets.

In another example, a given metric may be related to the number of bad data packets. The UE may switch to a non-preferred network (e.g., LTE network) when it receives a high number of bad data packets (e.g., 50 bad data packets). The UE may switch back to a preferred network (e.g., WiFi network) when it starts to receive a lower number of bad data packets (e.g., 40 bad data packets) and continue to stay on the preferred network until the UE again starts receiving a high number of bad data packets (i.e., the UE may still stay on the preferred network even when it receives 45 bad data packets). This may help avoid constant back and forth switching between the networks. In one example, the APP 112 may be initiated responsive to a service generated by the UE 110. Alternatively, the APP 112 may be initiated responsive to a service received by the UE 110. For example, the service may be a VoIP audio call or a video call, and either type of call can be made from the UE device or received at the UE device. In such an example, either a user activation of the UE device to initiate an outbound call or receipt of signaling for an inbound call at the UE device will cause the UE device to launch and execute the appropriate voice and/or video call APP 112.

At step 570, the APP 112 may then run over WiFi AP, according to step 560 and connect to the PDN 180. At step 580, the UE 110 may notify the user that the WiFi AP 130 is out of network range. For example, the notification may indicate a poor quality of a specific service due to a weak signal strength in the network. In one example, a policy determination may be related to the QoS for the specific service. As such, weak signal may be a factor in determination of the policy to stay with or leave the WiFi network, when the UE 110 is out of WiFi coverage. The APP 112 may also notify the user that the operation of the APP 112 has ended. Accordingly, the user may then switch back to the default LTE connection at step 590. Alternatively, the UE 110 may automatically switch to the LTE connection upon determining that the operation of the APP 112 has ended.

In another example, the WiFi network may be congested when an excessive number of users (i.e., the number of users beyond the capacity of the network) try to use the network at the same time. As such, the quality of a service, provided by the WiFi network may degrade due to the network congestion. Thus, the network congestion may be a factor in determination of the policy to stay or leave the WiFi network. Alternatively, the UE 110 may notify the user that the WiFi network has a low quality due to network congestion. The user may then provide a preference to switch to the LTE connection.

Figure 6:
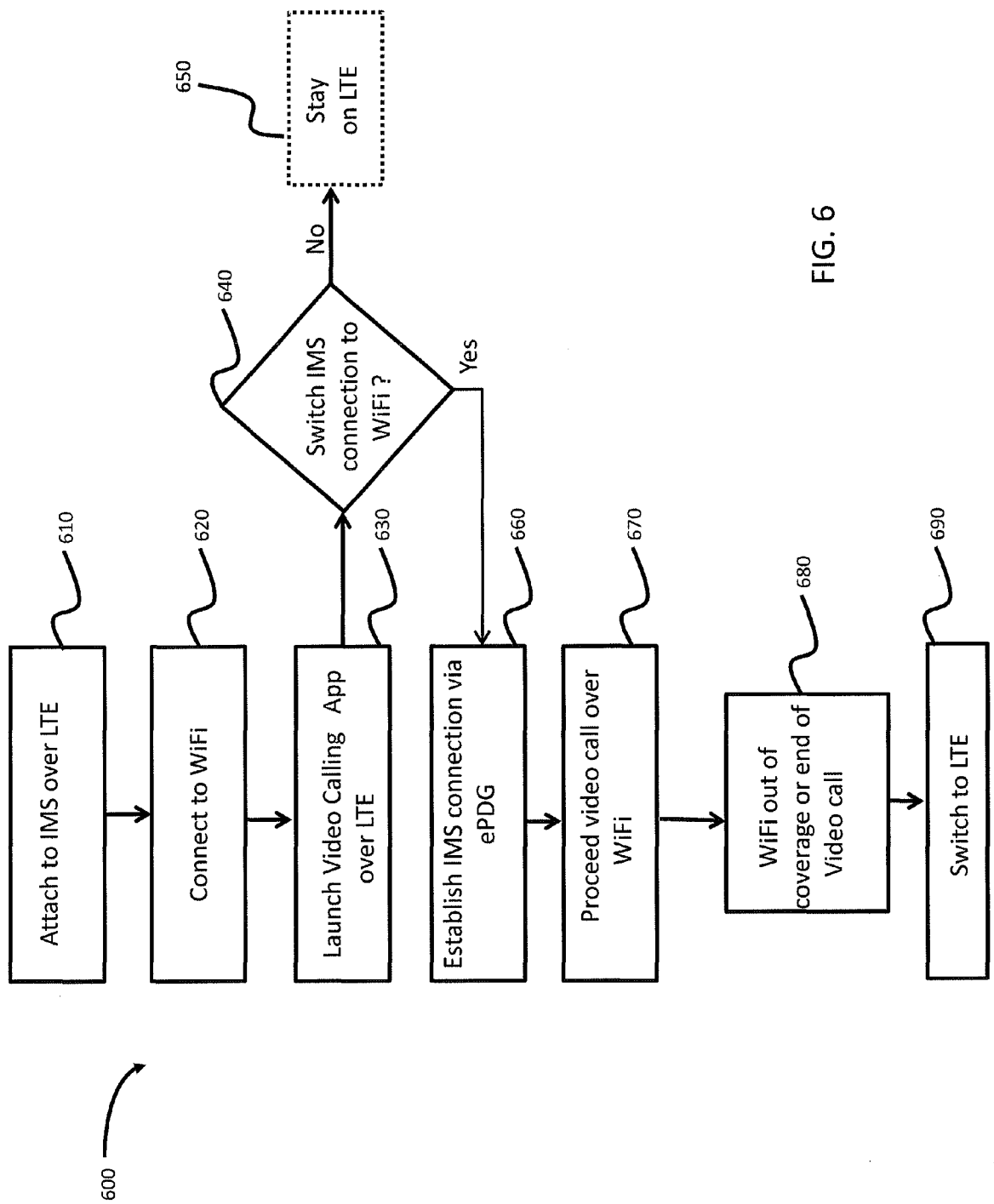
FIG. 6 is a diagram of an example process for a user device to switch a video call from LTE to WiFi.

FIG. 6 shows a high level flow chart of a methodology for supporting handovers between the LTE cellular network and ePDG for IMS 280 based on services on devices. For example, services such as VoIP calls are supported over the LTE network as the default gateway of connecting to the IMS 280. However, video calls, also supported on IMS 280 may trigger the ePDG client 214 on the UE 110 to connect to ePDG 270 via WiFi 230 and continue the video call over the ePDG 270 route. Once the video call ends, connection to IMS 280 may be switched back to the LTE cellular network/ eNB 220.

Steps 610 and 620 are similar to steps 510 and 520 of FIG. 5. At step 630, a video calling APP 212 may be initiated. In one example, the video call APP 212 may be initiated by a user placing an outgoing video call from the UE 210. Alternatively, the APP 212 may be initiated by an incoming video call received by the UE 210. In either case, the UE 110 will be connected to the IMS 280 via APN 216 through the LTE network/eNB 220 as the default network connection.

At step 640, the video call APP 212 may request to switch the IMS connection from the default LTE network to the WiFi AP 230. The switch may be triggered by the video call APP 212 responsive to a QoS metric of the video call, for example. As described earlier in the description of FIG. 5, the APP 212 may provide the user a reason for switching (e.g., the UE may display a notification related to the quality of the network connection) and, if the user does not respond to the notification within a predetermined time, the UE may perform the switch automatically.

The operator servicing the UE 210 may provide the QoS metric for the video call. Alternatively, UE 210 may, itself, monitor over time quality information related to the video call supported by the IMS. During monitoring, the UE may gather and store the quality information related to the video call. As described earlier, the determination to switch may be responsive to a comparison of QoS metrics (e.g., comparison between instantaneous or average historic QoS values).

One of the main services supported by IMS 280 is VoIP. Voice is a sensitive service, and users demand top quality for voice services. As such, VoIP is typically carried over the LTE network because the operator of the user device can guarantee QoS over the LTE network that is owned and operated by the operator. For example, an operator may achieve this by giving priority to the voice packet data over internet data. By doing so, the operator may be able to guarantee the QoS for voice service even when the user is outside the operator network by ensuring that the voice packets arrive on time. On the other hand, a video call is a data consuming service. As such, the user may want to use a WiFi network for a video call service, so as not to use data in the user's data plan provided by the network operator. Although, in such a scenario, QoS may not be guaranteed by the network operator.

At step 640, if the user device 210 decides to switch to WIFI AP 230, at step 660, ePDG client 214 may set the IMS APN 216 over the ePDG 270 upon being notified by the video call APP 212. Alternatively, if the user decides not to switch, he or she may then stay on LTE at step 650. In a different implementation, the switch may occur based on different QoS metric threshold analyses performed by the UE, as described in the detailed description of FIG. 5.

At step 670, the video call may then proceed over the WiFi AP 230 according to the step 660. In this instance, both the audio and video services are routed over the WiFi AP 230. This may be advantageous for the user to maintain audio and video synchronization.

At step 680, the user may be notified that the WiFi AP 230 is out of network range by the UE 210. For example, the notification may indicate a poor quality of the video call due to a weak signal strength in the network. In one example, a policy determination may be related to the QoS for the video call. As such, weak signal may be a factor in determination of the policy to stay or leave the WiFi network, when the UE 110 is out of WiFi coverage. The APP 212 may also notify the user that the video call has ended. Accordingly, the user may then switch back to the default LTE connection at step 690. Alternatively, the UE 110 may automatically switch to the LTE connection upon determining that the video call has ended. The user may also prefer to route both the VoIP and the video call simultaneously over the WiFi network, for example, when the user is inside a building where the LTE connection may be poor compared to the available WiFi connection.

As described earlier with reference to FIG. 5, the network congestion may be a factor in determining the policy of whether to stay with or leave the WiFi AP. The user may alternatively provide a preference to switch to the LTE connection upon being notified by the UE of network congestion in the WiFi network.

Figure 7:
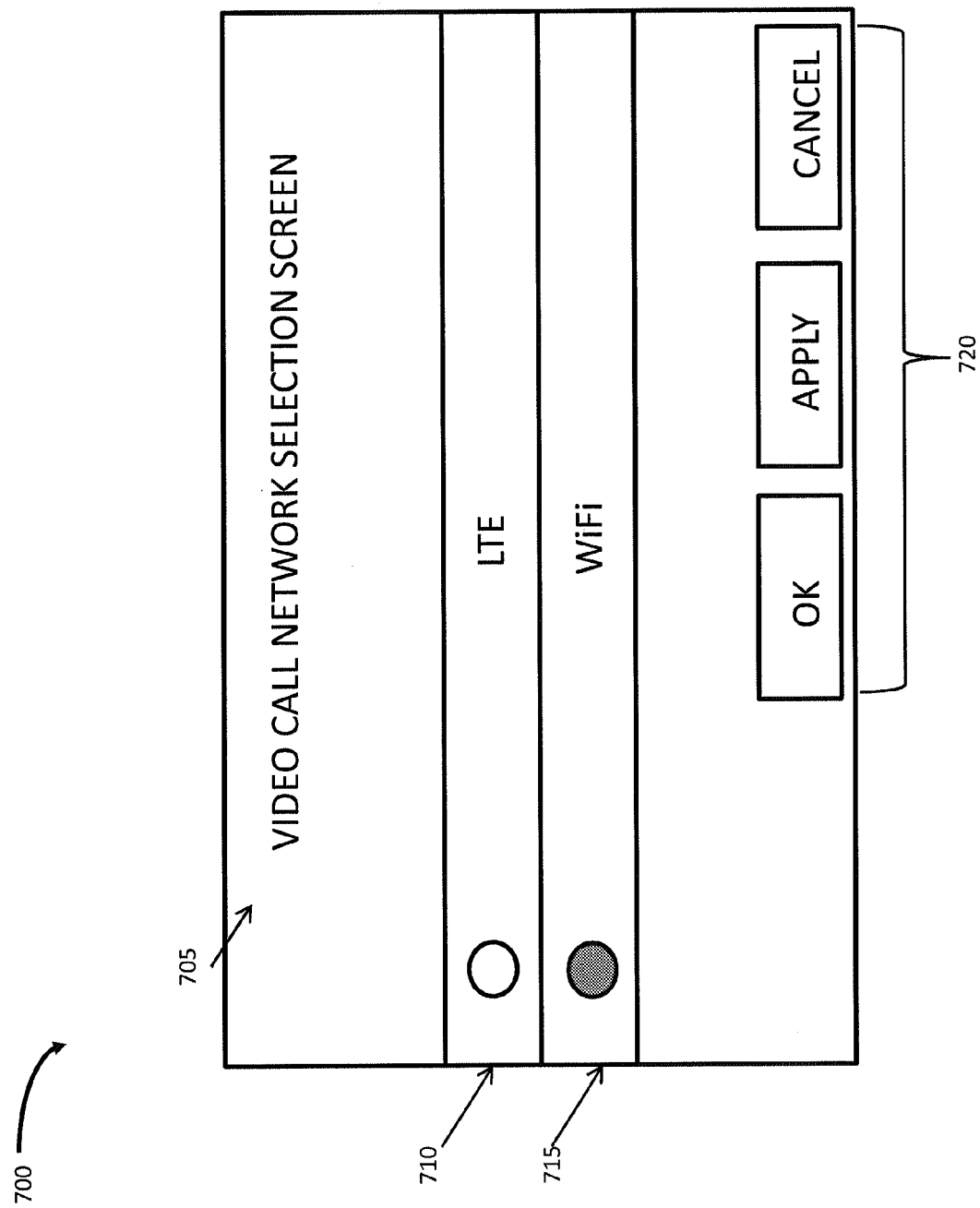
FIG. 7 is a diagram of an example user interface for switching a video call from LTE to WiFi.

FIG. 7 illustrates an example of a graphical user interface (GUI) 700 that may be displayed on a display of user device 210, while the processes shown in FIG. 6 are performed. As shown in FIG. 7, GUI 700 may include a title 705, a "video call network selection screen" selection item 710, a "video call selection mode" selection item 715, and buttons 720. Although FIG. 7 depicts example visual components of user interface 700, in other implementations, user interface 700 may include fewer visual components, additional visual components, different visual components, or differently visual arranged components than illustrated in FIG. 7. For example, selection items 710 and 715 may be presented in a different manner (e.g., as icons, differently colored text items, etc.).

As shown in FIG. 7, user interface 700 may include a title 705. Title 705 may serve to inform a user of the option to select between a LTE connection and a WiFi connection. Title 705 may include different, fewer, or additional words than those shown in FIG. 7. In one example, the Title 705 may convey notification about the different categories of the quality of service (e.g., upon a conversion of the metric information). The different categories of the quality of services may be excellent, good, fair, poor, etc.

User interface 700 may also include a "LTE" selection item 710 and a "WiFi" selection item 715. As described above, with respect to FIG. 6, a user of user device 210 may select between the two modes by selecting one of "LTE" selection item 710 and "WiFi" selection item 715. Each of "LTE" selection item 710 and "WiFi" selection item 715 may include visual indicators that indicate which mode has been selected. For example, the selected mode may be highlighted, or shaded differently from other visual portions of the screen. Additionally, or alternatively, a radio button next to the selected mode may be displayed differently (e.g., shaded, filled, etc.) than a radio button next to the un-selected mode. Additionally, or alternatively, a check mark may be displayed in connection with the selected mode, while a check mark is not displayed next in connection with the un-selected mode. Additionally, or alternatively, other visual cues may be provided that indicate which mode is selected.

User interface 700 may further include one or more buttons 720. Buttons 720 may be used to save or cancel a mode selection, and/or to navigate from user interface 900 to another GUI (not pictured). For example, buttons 720 may include an "OK" button, an "Apply" button, and a "Cancel" button. The "OK" button may save the selection of the network mode, as selected/displayed in user interface 700, and may also navigate away from user interface 700 to another user interface. The "Apply" button may save the selection of the video call mode, as selected/displayed in GUI 700, and may also leave user interface 900 displayed on a display of user device 110. The "Cancel" button may navigate away from user interface 700, without saving any changes to the selection of the latency mode that may have been made via mode selection items 710 or 715.

Systems and/or methods, described herein, may enable a network to identify service quality thresholds that correspond to levels of service quality associated with an application and/or service to be accessed by a user device. The systems and/or methods may transmit the service quality thresholds to a user device that allows the user device to use the service quality thresholds to identify a level of service quality associated with an application being accessed by the user device. The systems and/or methods may allow the user device to measure a level of service quality being received from the network. The systems and/or methods may enable the user device to render, for display, information associated with the measured level of service quality relative to the service quality thresholds.

The systems and/or methods may allow the user device to use the service quality thresholds and/or the measured levels of service quality and/or signal quality to select a manner in which an application and/or service is to be accessed. The systems and/or methods may, for example, allow the user device to select via which frequency band to access the application and/or service, and/or whether to access the application and/or service as unicast traffic or multicast traffic based on the service quality thresholds and/or the measured levels of service quality and/or signal quality.

The foregoing description provides illustration and description, but is not intended to be exhaustive or to limit the implementations to the precise form disclosed. Modifications and variations are possible in light of the above disclosure or may be acquired from practice of the examples.

While series of blocks have been described with regard to FIGS. 5 and 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions.

It should be emphasized that the terms "comprises"/"comprising" when used herein are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
    attaching a user equipment (UE) device to a Packet Data Network (PDN) supporting services over a long term evolution (LTE) network and establishing a first network connection to the PDN via the LTE network;
    establishing a WLAN connection from the UE device to a wireless local area network (WLAN) by the UE device;
    launching an application on the UE device to access at least one of the supported services;
    measuring a first Quality of Service (QoS) metric of the LTE network with respect to the at least one of the supported services;
    comparing the measured first QoS metric to a historic value of the first QoS metric of the WLAN with respect to the at least one of the supported services;
    determining, by the UE device and based on results of the comparing, when to switch from the first network connection to the WLAN connection based on a policy related to the at least one of the supported services;

switching by the UE device from the first network connection based on the determination;

overriding the policy upon switching by the UE device to maintain other ones of the supported services on the first network connection;

establishing by the UE device a second network connection to the PDN via the WLAN after the UE device has switched from the first network connection; and communicating between the application on the UE device and the PDN for UE access to the at least one of the supported services via the second network connection.

2. The method of claim 1, wherein the step of switching includes switching from the first network connection to the second network connection and further includes a step of sending a notification of the switching to an evolved packet data Gateway (ePDG).

3. The method of claim 2, wherein the step of sending the notification includes causing the application to communicate with an ePDG client on the UE device to connect with the PDN via the ePDG.

4. The method of claim 2, further including switching back to the first network connection to the PDN via the LTE network when the UE device determines that the UE device is out of coverage of the WLAN.

5. The method of claim 2, further including switching back to the first network connection when an operation of the service of the launched application ends.

6. The method of claim 1, further comprising:
monitoring the first QoS metric of the WLAN for a predetermined number of times with respect to the at least one of the support services, wherein the historic value is an average value determined for the predetermined number of times.

7. The method of claim 6, further comprising:
monitoring, with respect to the access of the at least one of the supported services, the first QoS metric of the WLAN for a predetermined time; and
switching back to the LTE network based on the monitoring of the first QoS metric being below the average value.

8. The method of claim 2, further including switching back to the first network connection upon receiving indication of a user preference, from a user of the UE device, in relation to a quality of the second network connection.

9. A method comprising:
a user equipment (UE) device attaching to an Internet protocol (IP) Multimedia Subsystem (IMS) over a long term evolution (LTE) network supporting services and establishing a first network connection to the IMS via the LTE network;
establishing a WLAN connection by the UE device to a Wireless Local Area Network (WLAN);
launching an application by the UE device to access at least one of the supported services;
measuring a first Quality of Service (QoS) metric of the LTE network with respect to the at least one of the supported services;
comparing the measured first QoS metric to a historic value of the first QoS metric of the WLAN with respect to the at least one of the supported services;
determining, by the UE device and based on results of the comparing, when to switch from the first network connection based on a policy related to the at least one of the supported services;
switching, by the UE device and based on results of the comparing, from the first network connection based on the determination;

overriding the policy upon switching by the UE device to maintain other ones of the supported services on the first network connection;

establishing by the UE device a second network connection to the IMS via the WLAN after the UE device has switched from the first network connection; and communicating between the application on the UE device and the IMS for UE access to the at least one of the supported services via the second network connection.

10. The method of claim 9, wherein the establishing the first connection further includes establishing a Voice over IP (VoIP) call over the first network connection as a default gateway.

11. The method of claim 9, wherein the switching further includes initiating an application associated with a video call as the application triggering the switch.

12. The method of claim 11, wherein the triggering the switch further includes notifying an evolved packet data gateway (ePDG) client on the UE device by the launched application associated with the video call to establish the second network connection.

13. The method of claim 12, further including running the launched application on the second network connection and continuing the video call.

14. The method of claim 12, further including switching back to the first network connection when the UE device is moved to a location that is out of coverage of the WLAN.

15. The method of claim 12, further including switching back to the first network connection when the video call ends.

16. The method of claim 9, further comprising:
monitoring the first QoS metric of the WLAN for a predetermined number of times with respect to the at least one of the support services, wherein the historic value is an average value determined for the predetermined number of times.

17. The method of claim 16, further comprising:
monitoring, with respect to the access of the at least one of the supported services, the first QoS metric of the WLAN related to a video call for a predetermined time; and
switching back to the LTE network based on the monitoring of the first QoS metric being below the average value.

18. A user equipment (UE) device comprising:
at least one network interface, configured to support services via a long term evolution (LTE) network and to support a connection via a wireless local area network (WLAN); and
a processor coupled to the network interface configured to cause the UE device to perform functions, including functions to:
attach to a Packet Data Network (PDN) supporting services over the LTE network and establish a first network connection to the PDN via the LTE network;
establish a WLAN connection to the WLAN;
launch an application on the UE device for execution by the processor to cause the UE device to access at least one of the supported services;
measure a first Quality of Service (QoS) metric of the LTE network with respect to the at least one of the supported services;
compare the measured first QoS metric to a historic value of the first QoS metric of the WLAN with respect to the at least one of the supported services;

determine, based on results of the comparison, to switch from the first network connection based on a policy related to the at least one of the supported services;

switch from the first network connection based on the determination;

override the policy upon switching to maintain other supported services on the first network connection;

establish a second network connection to the PDN via the WLAN after switching from the first network connection; and communicate between the application on the UE device and the PDN for UE access to at least one of the supported services, via the second network connection.

19. The UE device of claim 18, wherein:
the processor is further configured to cause the UE device to monitor the first QoS metric of the WLAN for a predetermined number of times with respect to the at least one of the support services, wherein the historic value is an average value determined for the predetermined number of times.

20. The UE device of claim 19, wherein:
the processor is further configured to cause the UE device to monitor, with respect to the access of the at least one of the supported services, the first Quality of Service (QoS) metric of the WLAN for a predetermined time; and switch back to the LTE network based on the monitored first QoS metric being below the average value.

* * * * *